(12) United States Patent
Yoshida et al.

(10) Patent No.: US 9,803,158 B2
(45) Date of Patent: *Oct. 31, 2017

(54) AROMATIC PRINTED OBJECT AND MANUFACTURE METHOD FOR THE SAME

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Maiko Yoshida, Mishima Shizuoka (JP); Taishi Takano, Sunto Shizuoka (JP); Takashi Urabe, Sunto Shizuoka (JP); Junichi Ishikawa, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,165

(22) Filed: Sep. 7, 2016

(65) Prior Publication Data

US 2017/0183605 A1    Jun. 29, 2017

Related U.S. Application Data

(63) Continuation-in-part of application No. 14/982,477, filed on Dec. 29, 2015.

(51) Int. Cl.
*G03G 9/093* (2006.01)
*C11B 9/00* (2006.01)
*B42F 1/00* (2006.01)
*B41M 3/00* (2006.01)
*G03G 9/08* (2006.01)

(52) U.S. Cl.
CPC ............... *C11B 9/00* (2013.01); *B41M 3/006* (2013.01); *B42F 1/00* (2013.01); *G03G 9/08* (2013.01); *G03G 9/0935* (2013.01); *G03G 9/09378* (2013.01)

(58) Field of Classification Search
CPC .. G03G 9/093; G03G 9/0935; G03G 9/09378; C11B 9/00; B42F 1/00; B41M 3/00; B41M 3/006
USPC ....................................... 428/321.5
See application file for complete search history.

(56) References Cited

U.S. PATENT DOCUMENTS

| 9,291,928 B2 | 3/2016 | Yoshida et al. |
| 2015/0132697 A1 | 5/2015 | Yoshida et al. |
| 2016/0154332 A1 | 6/2016 | Yoshida et al. |

OTHER PUBLICATIONS

Notice of Allowance for U.S. Appl. No. 14/982,477 dated Dec. 22, 2016, 7 pages.

*Primary Examiner* — Bruce H Hess
(74) *Attorney, Agent, or Firm* — Amin, Turocy & Watson LLP (57) ABSTRACT

An aromatic printed object containing a film-like substrate and a printing section formed on the film-like substrate using a perfume microcapsule-containing toner. The aromatic printed object is an adhesive sheet wherein the printing section is adherend surface. A protective layer is pressed with the adherend surface. A fragrance diverges by peeling off the protective layer of the film-like substrates.

13 Claims, 7 Drawing Sheets

AROMATIC PRINTED OBJECT AND MANUFACTURE METHOD FOR THE SAME

CROSS-REFERENCE TO RELATED APPLICATIONS

This application is a Continuation-in-Part of application Ser. No. 14/982,477 filed on Dec. 29, 2015, the entire contents of which are incorporated herein by reference.

FIELD

Embodiments described herein relate generally to an aromatic printed object and a manufacture method for the aromatic printed object.

BACKGROUND

A color material used as an electrophotographic toner includes four colors, that is, yellow, magenta, cyan and black generally. On the other hand, a material having interest is being provided to a field such as various cards and pamphlets, a direct mail and the like. An example of an interesting printed matter, a printed matter is proposed which is manufactured by carrying out an offset printing or a screen print with the use of a printing ink composition blended with a microcapsule that encapsulates perfume. In the printed matter, divergence of fragrance can be maintained over a long time.

Even in an electrophotographic field, a toner containing perfume or a toner obtained by a manufacture method containing a perfume processing process is proposed. However, though these toners are intended to improve unpleasant odor resulting from using an electrophotography, it is hard for people to determine that divergence of pleasant scent of these toners can be maintained over a long time.

Most of printed matters containing perfume microcapsule are printed matters whose fragrance diverges immediately after being printed or printed matters whose fragrance diverges by being rubbed by a finger or a claw. In a case of the latter printed matter, if a receiver of the printed matter does not understand that the printed matter includes aromatic property in advance, it is impossible to efficiently utilize the effect of the aromatic property.

DETAILED DESCRIPTION

An aromatic printed object of an embodiment is described.

The aromatic printed object of the embodiment comprises a film-like substrate and a printing section having a perfume microcapsule-containing toner. A pair of film-like substrates that face each other across the printing section is pressed, and fragrance diverges by peeling off the pressed part of the film-like substrates.

Figure 1:
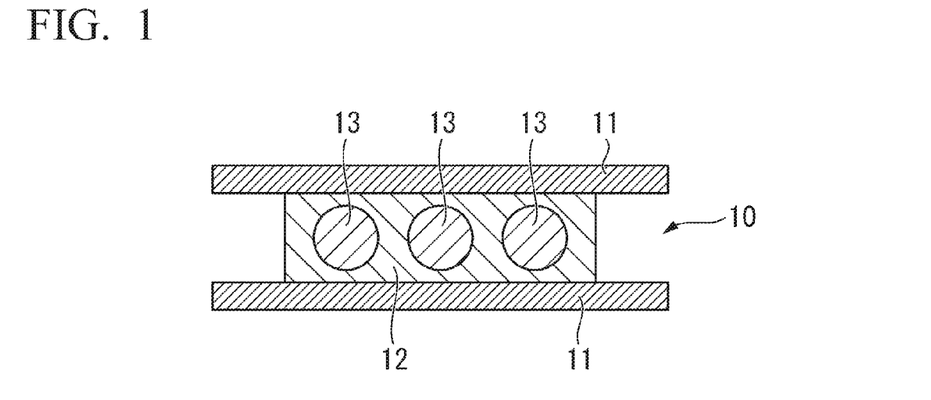
FIG. 1 is a cross-sectional view of a side surface of an aromatic printed object according to an embodiment.

FIG. 1 is a cross-sectional view of a side surface of the aromatic printed object according to an embodiment In an aromatic printed object 10 of the embodiment, a printing section 12 having a perfume microcapsule-containing toner is sandwiched between a pair of film-like substrates 11 and 11 and includes a function of adhering to the two film-like substrates 11 and 11. Perfume microcapsules 13, 13 and 13 are dispersed and held inside the printing section 12.

Not specifically limited to the film-like substrates 11 and 11, any substrate can be used as long as it can be printed. A paper or a plastic film is exemplified as a specific example of the film-like substrates 11 and 11.

The perfume microcapsule-containing toner contains a matrix resin and a perfume microcapsule.

The matrix resin is described.

The matrix resin that acts as a structural component of a normal toner particle for electrophotography is almost the whole the structural components of a perfume microcapsule-containing toner particle of the embodiment excluding a microcapsule that contains perfume. Specifically, the matrix resin at least contains a binder resin, and further contains an additive such as a release agent, a coloring agent, a charge control agent and the like as needed.

The binder resin is described.

The binder resin which is a main component of a toner has a function of fixing the toner on the film-like substrate.

Styrene-based resin such as Polystyrene, styrene-butadiene copolymer and styrene-acrylic copolymer; and ethylene-based resin such as polyethylene, polyethylene-vinyl acetate copolymer, polyethylene-norbornene copolymer, polyethylene-vinyl alcohol copolymer and the like are exemplified as the binder resin. Furthermore, Polyester resin, acrylic resin, phenolic resin, epoxy resin, diallyl phthalate resin, polyamide resin, maleic acid resin and the like are exemplified as the binder resin.

The binder resin is obtained by polymerizing a vinyl polymerizable monomer. As the vinyl polymerizable monomer, aromatic vinyl monomer such as styrene, methylstyrene, methoxystyrene, phenyl styrene, chlorostyrene and the like; ester-based monomer such as methyl acrylate, ethyl acrylate, butyl acrylate, methyl methacrylate, ethyl methacrylate, butyl methacrylate and the like; carboxylic acid-containing monomer such as acrylic acid, methacrylic acid, fumaric acid, maleic acid and the like; amine-based monomer such as amino acrylate, acrylamide, methacrylamide, vinylpyridine, vinylpyrrolidone and the like; and derivatives of these monomers are exemplified. One kind of the vinyl polymerizable monomer may be used singly; alternatively, more than or equal to two kinds of the vinyl polymerizable monomers may be combined to be used.

Further, the binder resin is obtained by polycondensation of polymerizable monomers of polycondensation system formed by an alcohol component and a carboxylic acid component.

As the alcohol component, aliphatic diol such as ethylene glycol, 1,3-propanediol, 1,4-butanediol, 1,5-pentanediol, 1,6-hexanediol, 1,7-heptane diol, 1,8-octane diol, 1,9-nonane diol, 1,10-decanediol, 1,4-butenediol, 1,2-propanediol, 1,3-butanediol, neopentyl glycol, 2-butyl-2-ethyl-1,3-propanediol and the like; aromatic diol such as alkylene oxide adduct of bisphenol A such as polyoxypropylene (2.2)-2,2-bis (4-hydroxyphenyl) propane, polyoxyethylene (2.2)-2,2-bis (4-hydroxyphenyl) propane and the like; valent polyhydric alcohols such as glycerin, pentaerythritol and the like; and derivatives of these components are exemplified. One kind of the alcohol component may be used singly; alternatively, more than or equal to two kinds of the alcohol components may be combined to be used.

As the carboxylic acid component, aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecyl succinic acid, n-dodecenylsuccinic acid and the like; alicyclic dicarboxylic acids such as cyclohexane dicarboxylic acid and the like; aromatic dicarboxylic acids such as phthalic acid, isophthalic acid, terephthalic acid and the like; ≥3 valent polyvalent carboxylic acids such as trimellitic acid, pyromellitic acid and the like; and derivatives of these components are exemplified. One kind of the carboxylic acid component may be used singly; alternatively, more than or equal to two kinds of the carboxylic acid components may be combined to be used.

Any one of well-known auxiliary agents used at the time of the polymerization process of the binder resin, for example, a chain transfer agent, a crosslinking agent, a polymerization initiator, a surfactant, a flocculant, a pH adjusting agent and an antifoaming agent, can be used at the time of the polymerization process of the polymerizable monomer.

Carbon tetrabromide, dodecyl mercaptan, trichlorobromomethane and dodecanethiol are exemplified as the chain transfer agent.

A compound consisting of more than two unsaturated bonds such as divinyl benzene, divinyl ether, divinyl naphthalene and diethyleneglycol dimethacrylate is exemplified as the crosslinking agent.

Water-soluble initiator and oil-soluble initiator are exemplified as the polymerization initiator. These polymerization initiators are properly used by the polymerization method.

As the Water-soluble initiator, persulfate such as potassium persulfate, ammonium persulfate and the like, azo compound such as 2,2-azobis (2-aminopropane) and the like, hydrogen peroxide, and benzoyl peroxide are exemplified. As the oil-soluble initiator, azo compound such as azobisisobutyronitrile, azobis dimethyl valeronitrile and the like; and peroxide such as benzoyl peroxide, dichlorobenzoyl peroxide and the like are exemplified. Redox initiator can also be used as needed.

Anionic surfactant, cationic surfactant, amphoteric surfactant and non-ionic surfactant are exemplified as the surfactant.

As the anionic surfactant, fatty acid salt, alkyl sulfate ester salt, polyoxyethylene alkyl ether sulfate, alkylbenzene sulfonate, alkylnaphthalene sulfonate salt, dialkyl sulfosuccinate salt, alkyl diphenyl ether sulfonic acid salt, polyoxyethylene alkyl ether phosphate, alkenyl succinic salt, alkane sulfonic acid salt, naphthalenesulfonic acid formalin condensate salt, aromatic sulfonic acid formalin condensate salt, polycarboxylic acid and polycarboxylate are exemplified.

Alkylamine salt and alkyl quaternary ammonium salts are exemplified as the cationic surfactant.

Alkyl betaine and alkyl amine oxide are exemplified as the amphoteric surfactant.

As the non-ionic surfactant, polyoxyethylene alkyl ether, polyoxyalkylene alkyl ether, polyoxyethylene derivative, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene hydrogenated castor oil, polyoxyethylene alkyl amine and alkyl alkanol amide are exemplified.

One kind of the surfactant may be used singly; alternatively, more than or equal to two kinds of the surfactants may be combined to be used.

As the flocculant, monovalent salt such as sodium chloride, potassium chloride, lithium chloride and sodium sulfate; divalent salt such as magnesium chloride, calcium chloride, magnesium sulfate, calcium nitrate, zinc chloride, ferric chloride and ferric sulfate; and trivalent salt such as aluminum sulfate and aluminum chloride are exemplified. Furthermore, organic coagulating agent and organic polymer flocculant such as quaternary ammonium salt such as poly (hydroxypropyl dimethyl ammonium chloride) and poly (diallyl dimethyl ammonium chloride) are exemplified as the flocculant.

Acidic compounds such as hydrochloric acid, sulfuric acid, nitric acid, acetic acid, citric acid and phosphoric acid; and alkalis such as sodium hydroxide, potassium hydroxide, ammonia and amine compound are exemplified as the pH adjusting agent. As the amine compound, dimethylamine, trimethylamine, monoethylamine, diethylamine, triethylamine, propylamine, isopropylamine, dipropylamine, butylamine, isobutylamine, sec-butylamine, monoethanolamine, diethanolamine, triethanolamine, triisopropanolamine, isopropanolamine, dimethylethanolamine amine, diethylethanolamine, N-butyl diethanolamine, N,N-dimethyl-1,3-diaminopropane and N,N-diethyl-1,3-diaminopropane are exemplified.

A surfactant indicating acidity or alkalinity is exemplified as the pH adjusting agent.

Lower alcohol-based antifoaming agent, organic polar compound-based antifoaming agent, mineral oil-based antifoaming agents and silicone-based antifoaming agent are exemplified as the antifoaming agent.

Methanol, ethanol, isopropanol and butanol are exemplified as the lower alcohol-based antifoaming agent.

2-ethylhexanol, amyl alcohol, diisobutyl carbinol, tributyl phosphate, oleic acid, tall oil, metal soap, sorbitan lauric acid monoester, sorbitan oleic acid monoester, sorbitan oleic acid triester, low molecular polyethylene glycol oleate, nonylphenol EO low molar adduct, Pluronic type EO low molar adduct, polypropylene glycol and their derivatives are exemplified as the organic polar compound-based antifoaming agent.

Surfactant mixed product of mineral oil and surfactant mixed product of mineral oil and fatty acid metal salt are exemplified as the mineral oil-based antifoaming agent.

Silicone resin, surfactant mixed product of silicone resin and inorganic powder mixed product of silicone resin are exemplified as the silicone-based antifoaming agent.

One kind of the binder resin may be used singly; alternatively, more than or equal to two kinds of the binder resins may be combined to be used.

The polyester resin of which fixing property is excellent and which has less influence on the fragrance is preferred as the binder resin. Further, it is preferred that an acid value of the polyester resin is greater than 1 mgKOH/g. If the acid value of the polyester resin is greater than the foregoing lower limit value, dispersibility of a particle is enhanced when the binder resin is taken as the particle. Specifically, dispersion liquid of a fine particle whose particle diameter is small can be easily obtained at the time alkaline pH adjusting agent is added in the agglutination method described later.

A glass transition temperature (Tg) of the binder resin is preferably within a range from 45 degrees centigrade to 60 degrees centigrade, and more preferably within a range from 45 degrees centigrade to 60 degrees centigrade.

If the glass transition temperature of the binder resin is smaller than an upper limit value, as a fixing temperature decreases, the fixing property of fixing the perfume microcapsule-containing toner onto the film-like substrate is increased, and meanwhile the perfume can be maintained inside of the fixed pressed part. As a result, when the pressed part of the film-like substrates is peeled off, the perfume microcapsule suffers a shearing force to be destroyed and thus the fragrance diverges certainly. If the glass transition temperature of the binder resin is greater than the lower limit value, as stability of the toner at the normal temperature and normal pressure is increased, practicability can be ensured.

The glass transition temperature (Tg) of the binder resin is measured by, for example, a DSC.

A softening point of the binder resin is preferably within a range from 80 degrees centigrade to 180 degrees centigrade, and more preferably within a range from 90 degrees centigrade to 160 degrees centigrade. If the softening point of the binder resin is within the preferred range, it becomes easy to suppress the divergence of the fragrance at the time of manufacture and fixing of the toner. Further, fixing fastness of the toner to the film-like substrate is easily enhanced. Consequentially, when the pressed part of the film-like substrates is peeled off, the perfume microcapsule is applied with shearing force to be destroyed effectively, and thus the fragrance can diverge.

The softening point of the binder resin is measured by, for example, a DSC.

A odorless resin or a resin with little odor which has no influence on the fragrance of the perfume is preferred as the binder resin.

A glass transition temperature and a softening point of the matrix resin are dominated by the foregoing binder resin serving as main component, but can be adjusted to some extent by being added with under-mentioned release agent.

The release agent is described.

The release agent is not essential as the structural component of the matrix resin of the toner particle; however, in order to enhance lower temperature fixing property of the toner, prevent the surface of a roller from being polluted at the time of the heat fixing by the toner and improve rub resistance of the printed matter, the release agent is added in the matrix resin as necessary.

As the release agent, aliphatic hydrocarbon-based wax such as low molecular weight polyethylene, low molecular weight polypropylene, polyolefin copolymer, polyolefin wax, microcrystalline wax, paraffin wax and Fischer-Tropsch wax; oxide of aliphatic hydrocarbon-based wax such as acid value polyethylene wax and their block copolymers; vegetable wax such as candelilla wax, carnauba wax, Japan wax, jojoba wax and rice wax; animal wax such as beeswax, lanolin and spermaceti; mineral wax such as ozokerite, ceresin and petrolatum; wax such as montanic acid ester wax and castor wax that takes fatty acid ester as a main component; and wax such as deoxidized carnauba wax obtained by de-oxidizing a part or all of fatty acid esters are exemplified.

Further, as the release agent, saturated straight chain fatty acid such as palmitic acid, stearic acid and montanic acid (contains long-chain alkyl carboxylic acid having alkyl group longer than montanic acid); unsaturated fatty acid such as brassidic acid, eleostearic acid and parinaric acid; saturated alcohol such as stearyl alcohol, eicosyl alcohol, behenyl alcohol, carnaubyl Bill alcohol, glyceryl alcohol and melissyl alcohol (contains long-chain alkyl alcohol having alkyl group longer than melissyl alcohol); polyhydric alcohol such as sorbitol; fatty acid amide such as linolenic acid amide, oleic acid amide, and lauric acid amide; saturated fatty acid bisamide such as methylene-bis-stearic acid amide, ethylene capric acid amide, ethylenebis lauric acid amide and hexamethylene bis-stearic acid amide; unsaturated fatty acid amide such as ethylene-bis-oleic acid amide, hexamethylene bis-oleic acid amide, N, N'-dioleoyl adipic acid amide and N, N'-dioleylsebacic acid amide; aromatic bisamide such as m-xylene bis-stearic acid amide and N, N'-distearyl isophthalic acid amide; fatty acid metal salt (a substance referred to as metal soap generally) such as calcium stearate, calcium laurate, zinc stearate and magnesium stearate; wax obtained by graphing aliphatic hydrocarbon-based wax with the use of vinyl monomer such as styrene and acrylic acid; partial esterified compound of polyhydric alcohol and fatty acid such as behenic acid monoglyceride; and methyl ester compound having hydroxyl group obtained by hydrogenating vegetable oil and fat are exemplified.

It is preferred that an odorless release agent or a release agent with little odor which has no influence on the fragrance of the perfume is used as the release agent.

In a case in which the toner particle of the embodiment contains the release agent, the content of the release agent is preferably 1~20 mass % of the whole quantity of the toner. If the content of the release agent is smaller than the upper limit value, the release agent bleeds out from the printed microcapsule to easily suppress the volatilization of the perfume.

Another addition agent is described.

A charge control agent and an antioxidant can be added in the matrix resin as necessary.

A metal-containing azo compound and a metal-containing salicylic acid derivative are exemplified as the charge control agent. Complex or complex salt of a metal element such as iron, cobalt or chromium or their mixtures is preferred. As the metal-containing salicylic acid derivative compound, complex or complex salt of the metal element (e.g. zirconium, zinc, chromium or boron), or their mixtures are exemplified.

The perfume microcapsule is described.

The perfume microcapsule has a structure in which the perfume is encapsulated by microcapsule (wall film) made from resins.

A volume average particle diameter of the perfume microcapsule is preferably 0.01~10 μm, and more preferably 0.5~5 μm. If the volume average particle diameter of the perfume microcapsule is greater than 0.10 μm, it is easy to moderately destroy the microcapsule and to diverge the fragrance efficiently. If the volume average particle diameter of the perfume microcapsule is smaller than 10 μm, the particle diameter of the toner does not become too large, and a fine image quantity can be obtained easily when the toner is mixed with the color material to be used. The volume average particle diameter of the perfume microcapsule is preferably 1~70% of the volume average particle diameter of the toner particle (generally, 3~20 μm, preferably, 3~15 μm), and more preferably 10~50% in particular.

The perfume is described.

Liquid perfume is exemplified as the perfume encapsulated in the microcapsule. The liquid refers to liquid at a room temperature (25 degrees centigrade).

Oily perfume or diluted solution thereof that is usually used is exemplified as the liquid perfume. As the oily perfume, natural perfume or synthetic perfume such as bromine styrene, phenylalanine ethyl alcohol, linalool, hexyl Sina Mick aldehyde, α-limonene, benzyl aldehyde, eugenol, bornyl aldehyde, citronellal, Kororaru, terpineol, geraniol, menthol, cinnamic acid is exemplified. One kind of the oily perfume may be used singly; alternatively, more than or equal to two kinds of the oily perfumes may be combined to be used.

The diluted solution obtained by diluting the oily perfume with an odorless solvent such as benzyl benzoates is exemplified as the diluted solution of the oily perfume.

The microcapsule is described.

As a resin forming the microcapsule (wall film) that encapsulates the perfume, a urea-formaldehyde resin, a melamine-formaldehyde resin, a guanamine-formaldehyde resin, a sulfonamide-aldehyde resin and an aniline-formaldehyde resin are exemplified. Even among these resins, the melamine-formaldehyde resin is preferred as water resistance, chemical resistance, solvent resistance and aging resistance thereof are excellent.

Microcapsulation is described.

As a method of the microcapsulation of the perfume, an interfacial polymerization method, a coacervation method, an In-situ polymerization method, a drying method in liquid and a cured coated film method in liquid are exemplified. even among these methods, the In-situ polymerization method that uses a melamine resin as a shell component (wall film) and the interfacial polymerization method that uses an urethane resin as a shell component (wall film) are preferred.

In a case of the In-situ polymerization method, first, the foregoing oily perfume or diluted solution thereof is emulsified in water-soluble polymers or aqueous surfactant solution. Then, the perfume is microencapsulated by adding, heating and polymerizing melamine-formalin prepolymer aqueous solution. As necessary, pH of the system is adjusted to acidity, prepolymer aqueous solution is dividedly added and the polymerization may be continued.

In a case of the interfacial polymerization method, first, the foregoing oily perfume or diluted solution thereof and polyvalent isocyanate prepolymer are dissolved, mixed and emulsified in water-soluble polymers or aqueous surfactant solution. Then, the perfume is microencapsulated by adding, heating and polymerizing polyvalent base such as diamine or diol.

A mass ratio of the resin that forms the wall film of the microcapsule is preferably 0.1~1 pts·mass, and more preferably 0.2~0.5 pts·mass with respect to 1 pts·mass of the perfume.

A mass ratio of the perfume microcapsule dispersed in the toner particle is preferably 0.5~30 pts·mass, and more preferably 1~15 pts·mass with respect to 100 pts·mass of the matrix resin.

The coloring agent is described.

As the perfume microcapsule-containing toner of the embodiment, a form of containing a coloring agent (coloring aromatic toner) and a form of containing no coloring agent (non-coloring aromatic toner) are exemplified. It is preferred that the coloring agent is contained in the matrix resin to avoid the interaction with the perfume (in particular, oily perfume).

A pigment or dye is exemplified as a coloring agent blended in the coloring aromatic toner. Even between the pigment and dye, the pigment is preferred from the point that the bleeding of the perfume (in particular, oily perfume) released after the microcapsule is destroyed of the image or the printed matter is easy to be suppressed. Either of an organic pigment and an inorganic pigment can be used as the pigment.

A black pigment, a yellow pigment, a magenta pigment and a cyan pigment are exemplified as the pigment.

A carbon black is exemplified as the black pigment. As the carbon black, acetylene black, furnace black, thermal black, channel black and Ketjen Black are exemplified. One kind of the black pigment may be used singly; alternatively, more than or equal to two kinds of the black pigments may be combined to be used.

As the yellow pigment, C. I. Pigment Yellow 1, 2, 3, 4, 5, 6, 7, 10, 11, 12, 13, 14, 15, 16, 17, 23, 65, 73, 74, 81, 83, 93, 95, 97, 98, 109, 117, 120, 137, 138, 139, 147, 151, 154, 167, 173, 180, 181, 183, 185; and C. I. Bat yellow 1, 3, 20 are exemplified. One kind of the yellow pigment may be used singly; alternatively, more than or equal to two kinds of the yellow pigments may be combined to be used.

As the magenta pigment, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 146, 150, 163, 184, 185, 202, 206, 207, 209, 238; C.I. Pigment violet 19; and C.I. bat Red 1, 2, 10, 13, 15, 23, 29, 35 are exemplified. One kind of the magenta pigment may be used singly; alternatively, more than or equal to two kinds of the magenta pigments may be combined to be used.

As the cyan pigment, C.I. Pigment Blue 2, 3, 15, 16, 17; C.I. bat Blue 6; and C.I. Acid Blue 45 are exemplified. One kind of the cyan pigment may be used singly; alternatively, more than or equal to two kinds of the cyan pigments may be combined to be used.

Further, the coloring agent can user one kind of various pigments singly or equal to or more than two kinds of the pigments in a combination manner.

Through the foregoing description, the perfume microcapsule-containing toner can be manufactured by aggregating the matrix resin that contains the binder resin and the perfume microcapsule to a particulate.

The content of the matrix resin, which is not limited specifically, is preferably 80~95 mass % of the whole mass of the perfume microcapsule-containing toner, and more preferably 90~95 mass %. The content of the binder resin, which is not limited specifically, is preferably 78~93 mass % of the whole mass of the perfume microcapsule-containing toner, and more preferably 88~93 mass %. The content of the perfume microcapsule, which is not limited specifically, is preferably 5~20 mass % of the whole mass of the perfume microcapsule-containing toner, and more preferably 5~10 mass %.

The glass transition temperature of the perfume microcapsule-containing toner that contains the binder resin that is similar to the glass transition temperature of the binder resin is preferably within a range from 40 degrees centigrade to 60 degrees centigrade, and more preferably from 45 degrees centigrade to 60 degrees centigrade.

If the glass transition temperature of the perfume microcapsule-containing toner is smaller than the upper limit value, as the fixing temperature decreases, the fixing property of fixing the perfume microcapsule-containing toner onto the film-like substrate is enhanced, and meanwhile the perfume can be maintained inside the fixed pressed part. As a result, when the pressed part of the film-like substrate is peeled off, the perfume microcapsule suffers the shearing force to be destroyed and the fragrance diverges certainly. If the glass transition temperature of the perfume microcapsule-containing toner is greater than the lower limit value, as the stability of the toner at the normal temperature and normal pressure is increased, the practicability can be ensured.

A manufacture method of the aromatic printed object of the embodiment is described.

The manufacture method of the aromatic printed object of the embodiment includes a process of forming a printing section by printing the perfume microcapsule-containing toner on the film-like substrate, a processing of forming a film-like substrate laminate body by laminating a pair of film-like substrates across the printing section and a heating and pressing process of pressing a pair of the film-like substrates across the printing section by heating and pressing the film-like substrate laminate body at a pressure smaller than 0.20 N/mm2.

Not specifically limited to the method of printing the perfume microcapsule-containing toner on the film-like substrate, a print method using a well-known printer such as an electrophotographic machine can be used. In the printing process, a solid printing or a dot printing is carried out on a part other than a colored and printed image part with the use of the perfume microcapsule-containing toner. The printing process and the laminating process are described in detail with the use of FIG. 2 and FIG. 3.

The printing process is described.

Figure 2:
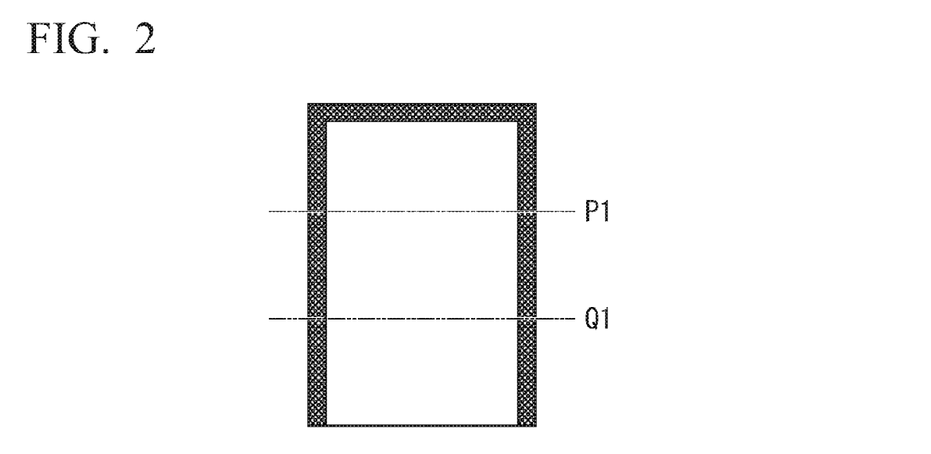
FIG. 2 is a plane view illustrating a first surface of a film-like substrate printed with a perfume microcapsule-containing toner.
Figure 3:
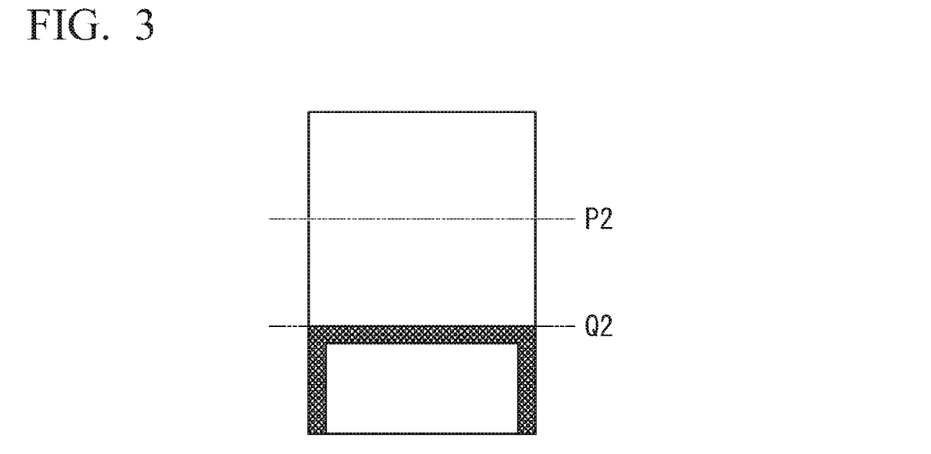
FIG. 3 is a plane view illustrating a second surface of a film-like substrate printed with a perfume microcapsule-containing toner.

FIG. 2 is a plane view illustrating a first surface of the film-like substrate on which the perfume microcapsule-containing toner is printed. The first surface which is a rectangle in a plane view is located at the inside of the printed matter to be subjected to the under-mentioned laminating process. FIG. 3 is a plane view illustrating a second surface of the film-like substrate. The second surface which is a rectangle in a plane view is located at the outside of the printed matter to be subjected to the under-mentioned laminating process. Virtual lines P1 and Q1 shown in FIG. 2 are orthogonal to the longitudinal direction of the film-like substrate which is the rectangle in the plane view and trisect the longitudinal direction. Virtual lines P2 and Q2 shown in FIG. 3 respectively correspond to the virtual lines P1 and Q1 shown in FIG. 2.

For example, as shown in FIG. 2, the solid printing is carried out, with the use of the perfume microcapsule-containing toner, at three sides consisting of two sides of the longitudinal direction and one side of the widthwise direction in the peripheral portion of the first surface of the film-like substrate.

As shown in FIG. 3, the solid printing is carried out, with the use of the perfume microcapsule-containing toner, at two sides of the longitudinal direction in the peripheral portion of the second surface of the film-like substrate. However, a print range is a range from end portions of the two sides of the longitudinal direction to the virtual line Q2 (that is, about one third of the side of the longitudinal direction). The solid printing is carried out on the virtual line Q2 which links the two sides of the longitudinal direction.

If the perfume microcapsule-containing toner is printed on the image part of the film-like substrate where a colored non-aromatic toner is printed, the image part is overlapped with the printing section of the perfume microcapsule-containing toner, and both toners are pressed in the pressing process. If such a pressed part is peeled off, it is possible that the printing section of the perfume microcapsule-containing toner and the image part are peeled off together. Thus, the perfume microcapsule-containing toner is preferably printed on the part other than the image part of the film-like substrate.

Even if the perfume microcapsule-containing toner is printed on the part other than the image part of the film-like substrate, when a pair of film-like substrates that face each other across the printing section is heated and pressed in the heating and pressing process, a pressed part going through the image part may be formed by heating and pressing the colored non-aromatic toner of the image part again. If the pressed part based on such an image part is peeled off, a problem occurs that the image is transferred the other opposite film-like substrate. In order to avoid such a problem, at the time of manufacture of the aromatic printed object of the embodiment, it is preferred to adjust the fixing temperature of the colored non-aromatic toner that forms the image part to be higher than the fixing temperature of the perfume microcapsule-containing toner. Specifically, it is preferred to adjust the glass transition temperature of the colored non-aromatic toner to be higher than the glass transition temperature of the perfume microcapsule-containing toner.

An adhesion amount of the perfume microcapsule-containing toner to the film-like substrate is preferably within a range of 0.40~1.0 mg/cm$^2$, and more preferably 0.45~0.90 mg/cm$^2$.

If the adhesion amount of the perfume microcapsule-containing toner is smaller than the upper limit value, the perfume microcapsule-containing toner can be fixed on the film-like substrate surely in a short time and the occurrence of the unfixed toner can be suppressed. Thus, when the pressed part of the aromatic printed object is peeled off, it is possible to prevent that the peeling occurs at the unfixed toner location (for example, nearby the film-like substrate) and the shearing force is not efficiently applied to the perfume microcapsule. If the adhesion amount of the perfume microcapsule-containing toner is greater than the lower limit value, the amount of the perfume microcapsule can be ensured enough, and when the pressed part of the aromatic printed object is peeled off, sufficient fragrance can diverge from the perfume microcapsule.

The laminating process is described.

In the laminating process, the film-like substrates may be laminated manually or by a processing treatment machine. The laminating may be carried out by bending a film-like substrate or overlapping two or more separate film-like substrates.

For example, as shown in FIG. 2 and FIG. 3, after the solid printing is carried out on the film-like substrate with the use of the perfume microcapsule-containing toner, the first surface of the film-like substrate is internally fold along the virtual lines P1 and Q1 to form valley folds. The second surface of the film-like substrate is externally fold along the virtual lines P2 and Q2 to form mountain folds. In this way, a pair of film-like substrates that face each other across the printing section is overlapped by being fold to three folds. In this case, a pair of film-like substrates is connected by a bend section.

A method of overlapping a pair of film-like substrates that face each other across the printing section is not limited to foregoing three folds and may be two folds. Two separate film-like substrates may be overlapped across the printing section.

Next, an example of the laminating process of two folds with the folding processing machine is described.

Figure 4:
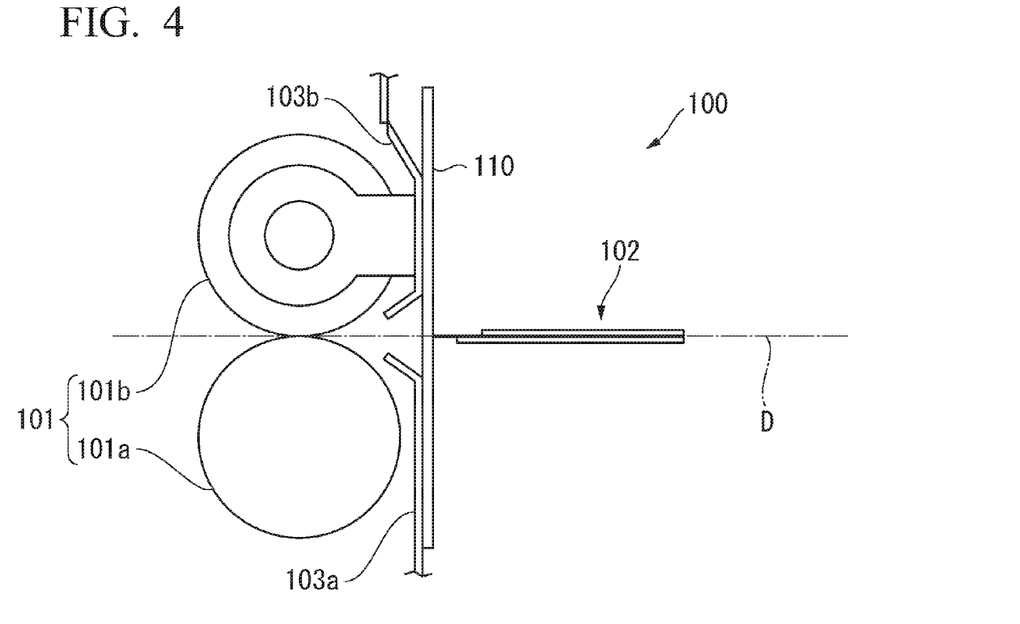
FIG. 4 is a schematic diagram of a side surface of a folding processing machine.
Figure 5:
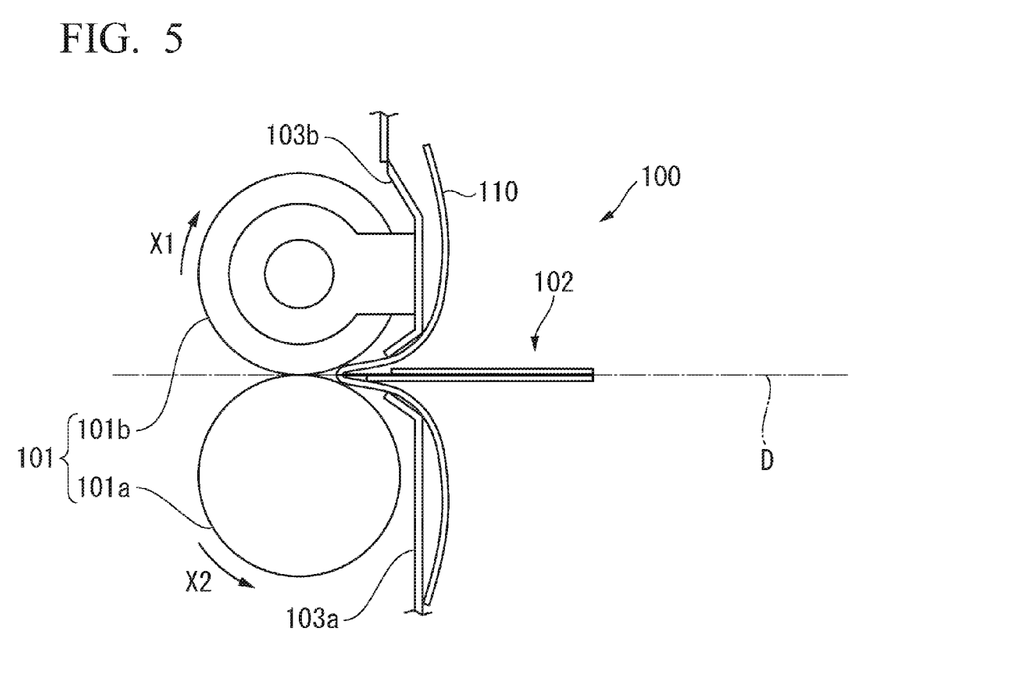
FIG. 5 is a schematic diagram of the side surface of the folding processing machine.

A folding processing machine 100 shown in FIG. 4 and FIG. 5 is provided with a folding roller pair 101 and a pushing member 102. The folding roller pair 101 is composed of a first roller 101a and a second roller 101b facing the first roller 101a. Further, the first roller 101a and the second roller 101b are arranged in parallel with each other. The second roller 101b may approach to or separate from the first roller 101a, and a Nip portion therebetween is formed as the second roller 101b approaches and abuts to the first roller 101a.

A first guide plate 103a is arranged at the side of the first roller 101a of a common tangent D of the Nip portion. A second guide plate 103b is arranged at the side of the second roller 101b of the common tangent D of the Nip portion.

The pushing member 102 is a flat plate-shaped member. The pushing member 102 is inserted into the Nip portion formed by the folding roller pair 101 through a driving module (not shown).

As shown in FIG. 4, the printed film-like substrate 110 is supplied to the folding processing machine 100. At this time, the film-like substrate 110 is supplied in a manner of sliding the first guide plate 103a and the second guide plate 103b in order. In this way, the film-like substrate 110 is arranged parallelly with a direction in which the first roller 101a and the second roller 101b are arranged.

Next, as shown in FIG. 5, the first roller 101a and the second roller 101b are rotated respectively along the X1 direction and X2 direction, and meanwhile the pushing member 102 is moved towards the folding roller pair 101 along the common tangent D. The pushing member 102 is inserted into the Nip portion while pushing the film-like substrate 110 into the Nip portion. The film-like substrate 110 pushed into the Nip portion is fold to two folds and meanwhile discharged from the folding roller pair 101 through the rotation of the first roller 101a and the second roller 101b.

In this way, the film-like substrate printed with the perfume microcapsule-containing toner can be fold to two folds mechanically.

Not specifically limited to a method of heating and pressing the film-like substrates overlapped across the printing section having the perfume microcapsule-containing toner, a pressing method using a well-known heating and pressing device can be used. A heating and pressing device applicable to the embodiment is an example of the heating and pressing device, which is shown in FIG. 6.

Figure 6:
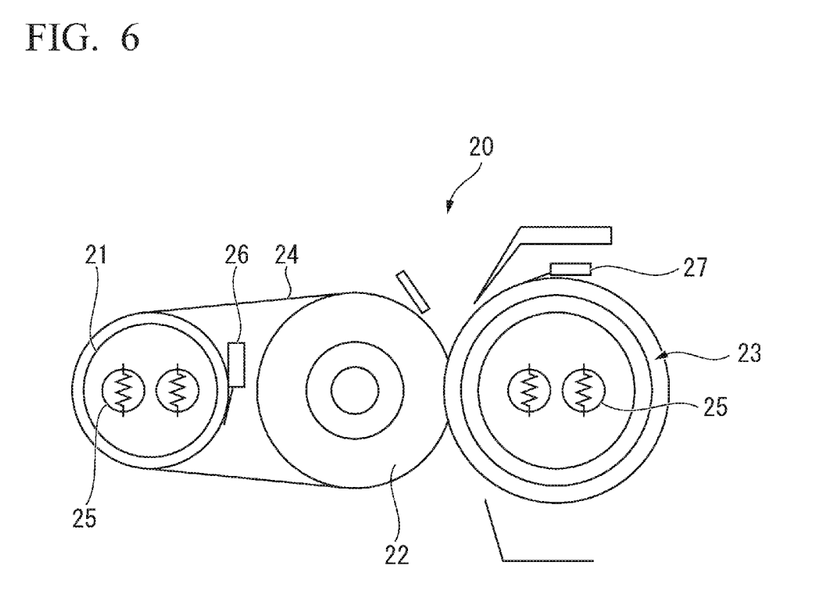
FIG. 6 is a schematic diagram of a side surface of a heating and pressing device.

A heating and pressing device 10 with a fixing belt 24 is illustrated in FIG. 6; however, the present invention is not limited to this.

The heating and pressing device 20 shown in FIG. 6 is composed of the fixing belt 24 for transporting the film-like substrate printed with the toner, a metal roller 21 and a fixing roller 22 for winding the fixing belt 24 to rotate the fixing belt 24, and a press roller 23 for connecting with the fixing roller 22 via the fixing belt 24 to heat and press the film-like substrate printed with the toner and transported by the fixing belt 24.

The fixing belt 24 is constituted by a nickel electroforming (substrate), a silicone rubber coated on the outer peripheral surface thereof, and a PFA (Perfluoroalkoxyalkane) tube for forming a surface layer. The metal roller 21 is constituted by aluminum core bar, and a PFA tube coated on the surface thereof.

Not specifically limited to the material of the metal roller 21, a well-known material can be used.

Not specifically limited to the material of the fixing roller 22, a well-known material can be used. The fixing roller 22 that connects with the press roller 23 via the fixing belt 24 has a function of heating and pressing the film-like substrate printed with the toner. The surface of the fixing roller 22 is coated with a heat-resistant rubber and a heat-resistant sponge.

The heat-resistant rubber or the heat-resistant sponge that coats the surface of the fixing roller 22 is preferably to hold proper hardness such that a desired pressure is obtained when the Nip portion is formed by the fixing roller 22 and the press roller 23. In a case in which the surface of the fixing roller 22 is coated by the heat-resistant sponge, the sponge hardness is preferably within a range of 30°~50°.

The press roller 23 is constituted by an iron core bar, a rubber coated on the outer peripheral surface and the PFA tube for forming a surface layer. The press roller 23 is equipped with a pressure spring.

The pressure (hereinafter, referred to as "surface pressure") at the time of the heating and pressing according to the present embodiment refers to a value obtained by dividing the force of the pressure spring built in the press roller 23 by an area obtained by multiplying the length of the longitudinal direction of the Nip portion formed by the fixing roller 22 and the press roller 23 by the Nip width.

A pair of film-like substrates overlapped across the printing section having the perfume microcapsule-containing toner is supplied between the fixing roller 22 and the press roller 23 and sandwiches between the fixing roller 22 and the press roller 23 to be heated and pressed. In this way, a pair of film-like substrate across the printing section is pressed and the aromatic printed object of the embodiment is manufactured.

The pressure of the heating and pressing is preferably smaller than $0.20$ $N/mm^2$, and more preferably smaller than $0.19$ $N/mm^2$. If the pressure is smaller than the upper limit value, it can be prevented that the perfume microcapsule is destroyed and the perfume is diverged. Further, it can be prevented that the surface of the fixed image is melted excessively, and the film-like substrate is winded to be peeled off when the pressed part is peeled off.

The lower limit value of the pressure is not limited specifically, as long as adhesiveness of the pressure to the film-like substrate on which the perfume microcapsule-containing toner is printed is ensured sufficiently. For example, $0.16$ $N/mm^2$ is exemplified.

Not specifically limited to the temperature of the heating and pressing, a temperature range within which the toner printed on the film-like substrate is fixed on the film-like substrate is applicable. In the aromatic printed object of the embodiment, the temperature of the heating and pressing is greater than the glass transition temperature of the perfume microcapsule-containing toner, but is preferably a temperature at which the fixing is promoted. However, at the time of the heating and pressing, as it is prevented that the image part formed by the colored non-aromatic toner is fixed on the a pair of film-like substrates, the temperature of the heating and pressing is preferably smaller than the glass transition temperature of the colored non-aromatic toner.

In FIG. 4~FIG. 6, in a case in which one film-like substrate is fold and pressed, the usable folding processing machine and the usable heating and pressing device are exemplified; however, two or more separate film-like substrates may be overlapped and pressed. In this case, for example, a heating and pressing device 30 having a binding processing function shown in FIG. 7~FIG. 9 can be used. The heating and pressing device 30, for example, receives the film-like substrate printed by a well-known printer such as an electrophotographic machine and processes this film-like substrate into the aromatic printed object.

Figure 7:
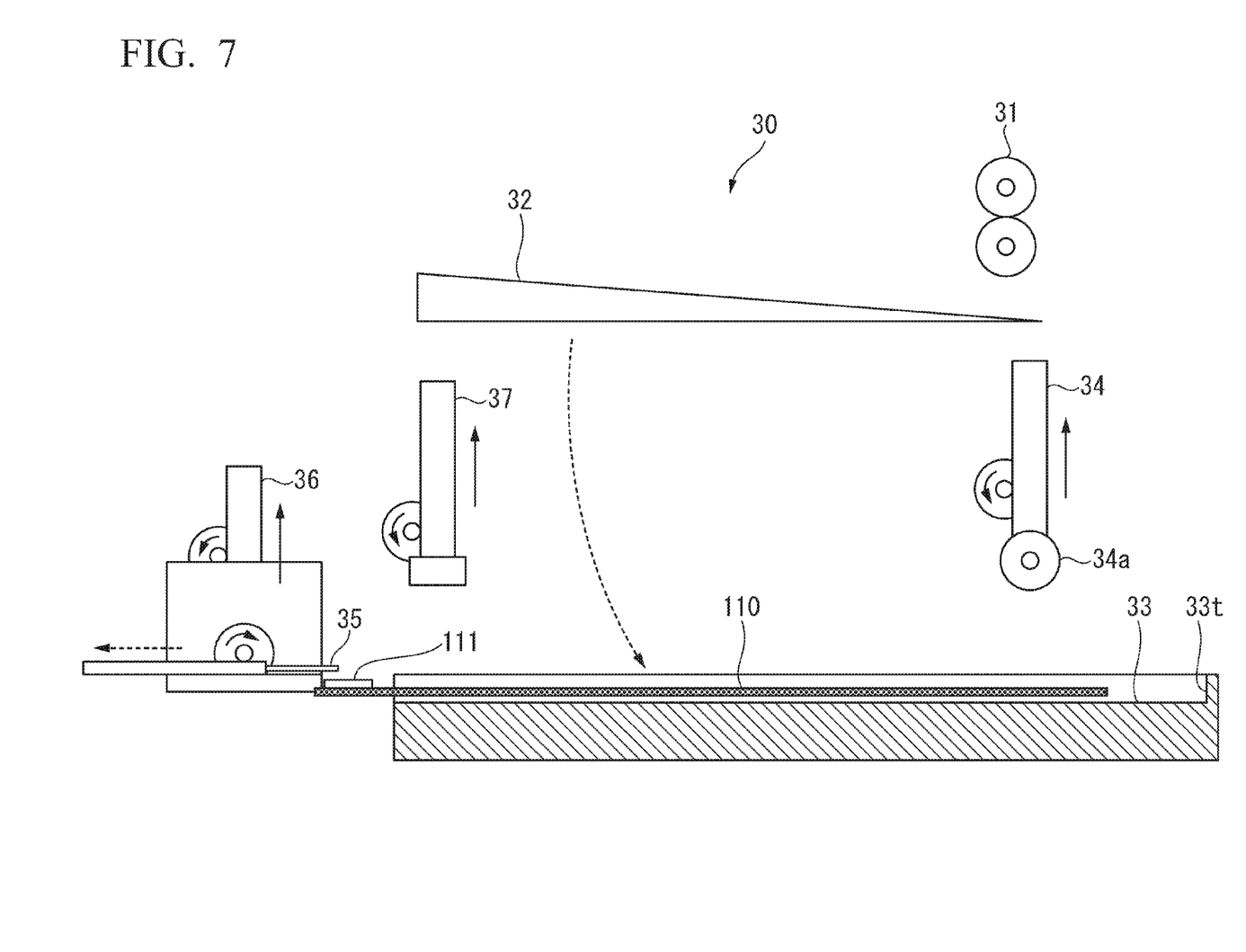
FIG. 7 is a schematic diagram of a side surface of a heating and pressing device having a binding processing function.
Figure 8:
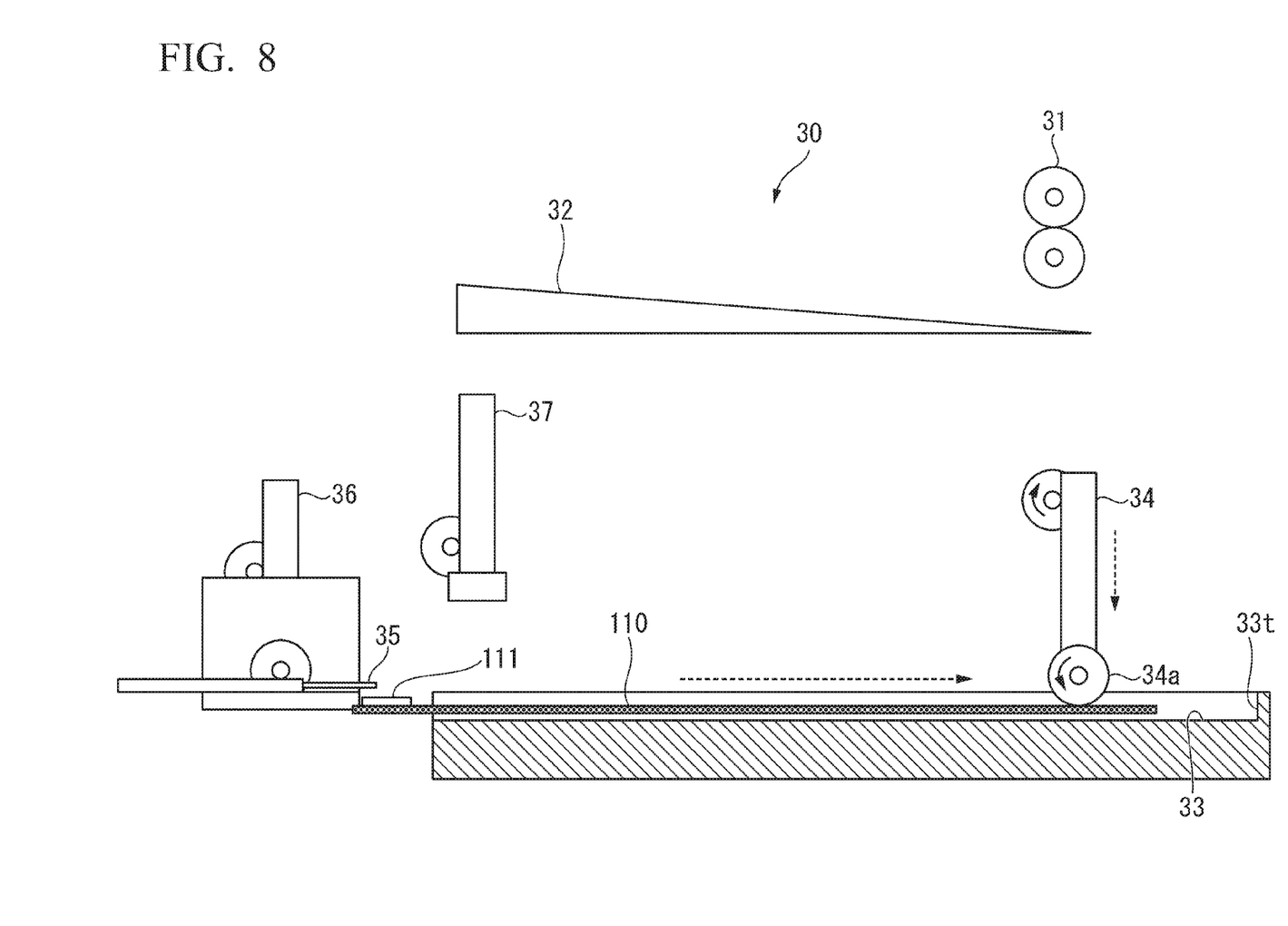
FIG. 8 is a schematic diagram of the side surface of the heating and pressing device having the binding processing function.
Figure 9:
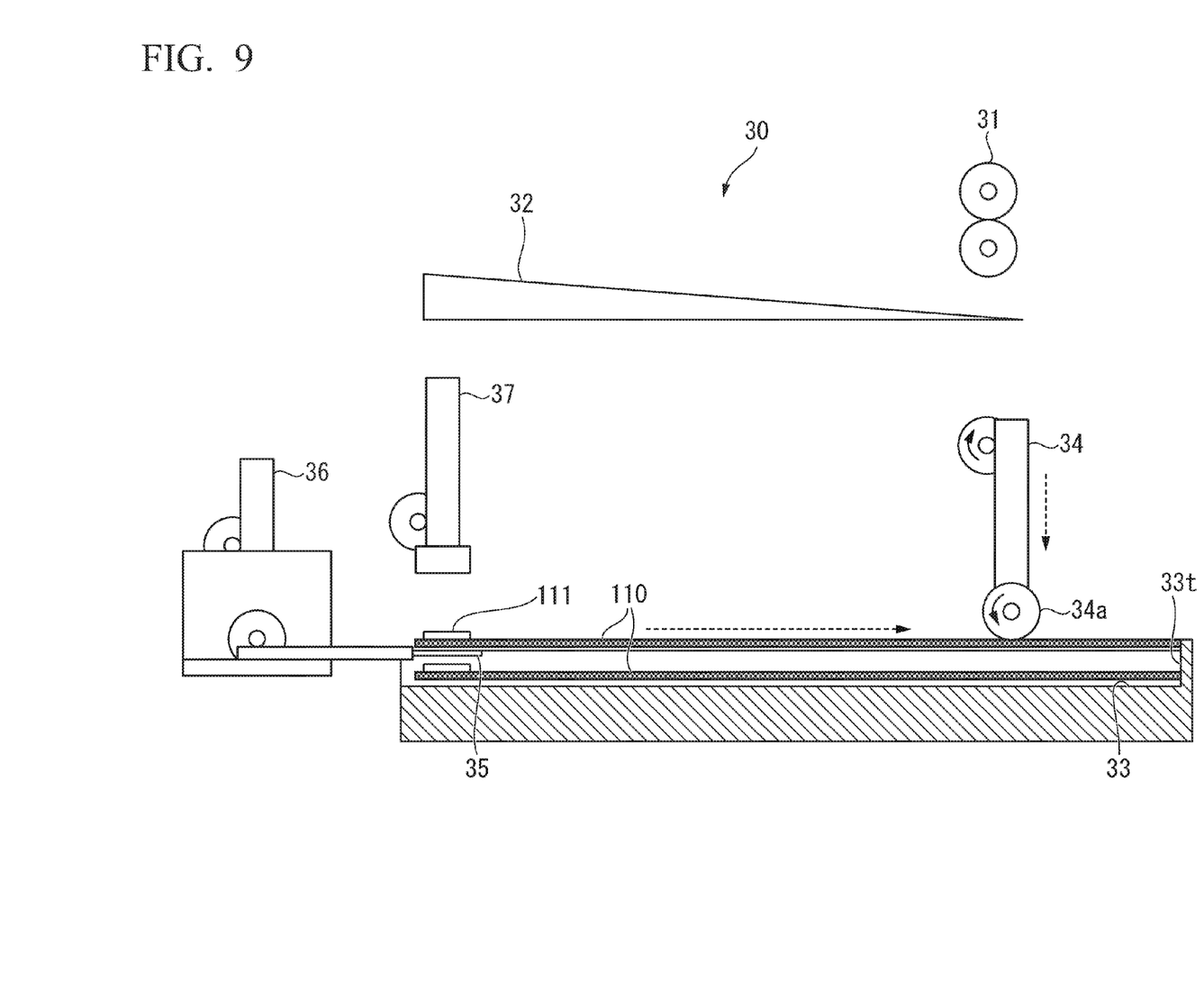
FIG. 9 is a schematic diagram of the side surface of the heating and pressing device having the binding processing function.

As shown in FIG. 7~FIG. 9, the heating and pressing device 30 is provided with a sheet conveyance section 31, a temporary tray 32, a tray 33, an alignment section 34, a heating member 35, an advancing/retreating mechanism 36 and a pressing section 37.

The sheet conveyance section 31 supplies the film-like substrate printed by the printer to the temporary tray 32. The temporary tray 32 that is arranged at the lower part of the sheet conveyance section 31 temporarily stores the film-like substrate supplied by the sheet conveyance section 31. The tray 33 that is arranged at the lower part of the temporary tray 32 is arranged to catch the film-like substrate 110 dropping from the temporary tray 32. The alignment section 34 that is arranged between the temporary tray 32 and the tray 33 has a function of aligning the film-like substrate with an alignment roller 34a provided in the alignment section 34. The heating member 35 heats the printing section of the film-like substrate. The heating member 35 is mounted on the advancing/retreating mechanism 36 that is located at the outside of the tray 33 and can move from one end of the tray 33 onto the tray 33 through the advancing/retreating mechanism 36. The pressing section 37 that is located between the temporary tray 32 and the tray 33 and arranged nearby the heating member 35 has a function of pressing the film-like substrate on the tray 33.

An abutting portion 33t for aligning the film-like substrate is arranged at the other end portion of the tray 33 opposite to the end portion into which the heating member 35 is inserted.

The manufacture method of the aromatic printed object is described with the use of the heating and pressing device 30.

The film-like substrate printed with the perfume microcapsule-containing toner is supplied by the sheet conveyance section 31 to be stored in the temporary tray. After the alignment section 34, the heating member 35 and the pressing section 37 retreat from the tray 33, as shown in FIG. 7, the film-like substrate 110 stored in the temporary tray 32 drops down to be supplied to the tray 33.

Then, as shown in FIG. 8, the alignment section 34 falls and the alignment roller 34a is pushed against the film-like substrate 110 on the tray 33. If the alignment roller 34a rotates, the film-like substrate 110 abuts against the abutting portion 33t and the position of the film-like substrate 110 is aligned.

Afterwards, the heating member 35 approaches to a printing section 111 on the aligned film-like substrate through the advancing/retreating mechanism 36 and is arranged at a heatable position.

Then, the second film-like substrate 110 drops on the aligned film-like substrate from the temporary tray 32 to be supplied to the tray 33 at the same procedures as the above. As shown in FIG. 9, the second film-like substrate 110 is aligned by the alignment section 34 and the abutting portion 33t of the tray 33. The printing section 111 on the film-like substrate 110 is heated by the heating member 35 connecting with the printing section 111. After the heating, the heating member 35 retreats from the film-like substrate 110 through the advancing/retreating mechanism 36, and the pressing section 37 falls to press the film-like substrates 110 overlapped across the printing section 111.

In this way, a pair of film-like substrates across the printing section having the perfume microcapsule-containing toner is heated and pressed, and the aromatic printed object of the embodiment is manufactured.

The pressure at the time of pressing and the temperature at the time of heating by the heating and pressing device 30 are identical to the pressure and the temperature of the heating and pressing device 20.

According to the aromatic printed object of the embodiment, through an operation of peeling off the pressed part of the aromatic printed object by the receiver of the aromatic printed object, the perfume microcapsule held inside the pressed part is applied with the shearing force to be destroyed. The perfume diverges from the destroyed perfume microcapsule, and the receiver can smell fragrant. Thus, it is not necessary for the receiver of the aromatic printed object to rub the aromatic printed object with a finger or a claw to diverge the fragrance.

In the aromatic printed object before the pressed part is peeled off, as the perfume is held in the microcapsule of the inside of the pressed part, the perfume does not be reduced, and the fragrance of the perfume microcapsule can diverge sufficiently through the peeling operation of the receiver of the aromatic printed object.

In a case of hoping to further diverge the fragrance, the fragrance can further diverge by rubbing the peeled part of the aromatic printed object of the embodiment with the finger or the claw and destroying the perfume microcapsule.

The Aromatic printed object in the present embodiments may be an adhesive sheet having an adhesive surface as the printing section.

For example, perfume microcapsules containing toner of the present embodiment, can be an aromatic adhesive, with or without containing an adhesive component. By printing the aromatic adhesive on a film-like substrate, it is possible to form an adhesive surface with the aromatic adhesive to the film-like substrate.

In the example shown in FIG. 1, aromatic printed 10A is an adhesive sheet, and film-like substrate 11A is provided with a printing section 12A. In printing section 12A, perfume microcapsules 13 are dispersed. The printing section 12A is an adhesive surface and contains an adhesive component. Further, on the printing section 12A of the opposite side of the film-like substrate 11A, a protective layer 14 is provided, which will be described later.

The adhesive component can be selected, for example, containing a polymer of an organic material such as acrylic, or containing inorganic material such as silicone. As the adhesive component, it is preferable to use a component which can be easily dispersed in a perfume microcapsule. As the adhesive component, in particular, appropriate conventionally-known pressure sensitive adhesive components can be used. The pressure sensitive adhesive is an adhesive which performs an adhesive force by being pressed. These pressure sensitive adhesives may be used to form the adhesive sites applied to the sheet or the like. In particular, pressure sensitive adhesives can be used for adhesion sites of the adhesive tape applied to the tape-like sheet. The pressure sensitive adhesive is also referred to as simply an adhesive.

The quantity ratio of the adhesive component and the perfume microcapsule in the aromatic adhesive is not particularly limited. The amount can be suitably selected so as not to lose the adhesive force of the adhesive component, depending on the intensity of the fragrance upon peeling off the adhesive sheet. For example, perfume microcapsules can be dispersed in a weight ratio comparable to perfume microcapsule in the toner particles described above, i. e. 0.5 to 30 parts by mass with respect to the adhesive 100 parts by weight of the component as described above.

With adhesive sheet 10A, a various sheet is used as a film-like substrate 11A. On at least one surface of the sheet, the adhesive surface by the aromatic adhesive mentioned above can be formed by printing. Sheets of material can be appropriately selected from materials that can adhere to the aromatic adhesive, for example, such as sheets of paper, cloth, plastic, or the like.

The adhesive sheet 10A may be adhered to the adhesive surface by the aromatic adhesive with another surface. As the other surfaces, other objects, other sheets, or other adhesive sheets can be selected.

Adhesive sheet 10A may be provided with a protective layer 14. The protective layer 14 is a layer provided to protect the printing section 12A before use of the adhesive sheet 10A. The protective layer 14 may be selected from structures having physical properties that can be easily peeled off from the printing unit 12A. Here, for easily peeling off, it is that it can be peeled off lightly by the operation by hand. More specifically, for example, the force of adhesion between the protective layer 14 and the printing units 12A, is weaker than the force of adhesion between the film-like substrate 11A and the printing unit 12A. The force of the adhesion between the protective layer 14 and the printing unit 12A may be a stronger force than the intensity which is broken the perfume microcapsule by the shearing force at the time of peeling. By said strong force, the adhesive sheet 10A is even able to emit a fragrance when being peeling off of the protective layer 14. Alternatively, the force of adhesion between the protective layer 14 and the printing unit 12A, may be a weaker force than the intensity which is broken perfume microcapsule by the shearing force at the time of peeling. By said weak force, when peeling off the protective layer 14 from the adhesive sheet 10A in order to affix the adhesive sheet 10A to the object, the adhesive sheet 10A does not diverge a fragrance, and when peeling off the adhesive sheet 10A from the object, it can be set that the adhesive sheet 10A diverges the fragrance. The constituent material of the protective layer 14 can be suitably selected with the consideration of the adhesion force between the printing section 12A. Constituent material of the protective layer 14, for example, may be resin, paper or cloth. In the example shown in the figures, constituent material of the protection layer 14 is a PET (polyethylene terephthalate) resin.

When the adhesive surface between the object of the adhesive sheet 10A is peeled, adhesive sheet 10A diverges the fragrance.

In the present embodiment, because it forms an adhesive surface by printing, the adhesive sheet 10A can be continuously manufactured. Therefore, it is easy to manufacture an adhesive sheet 10A with a large size, and a large amount of production is possible.

Figure 10:
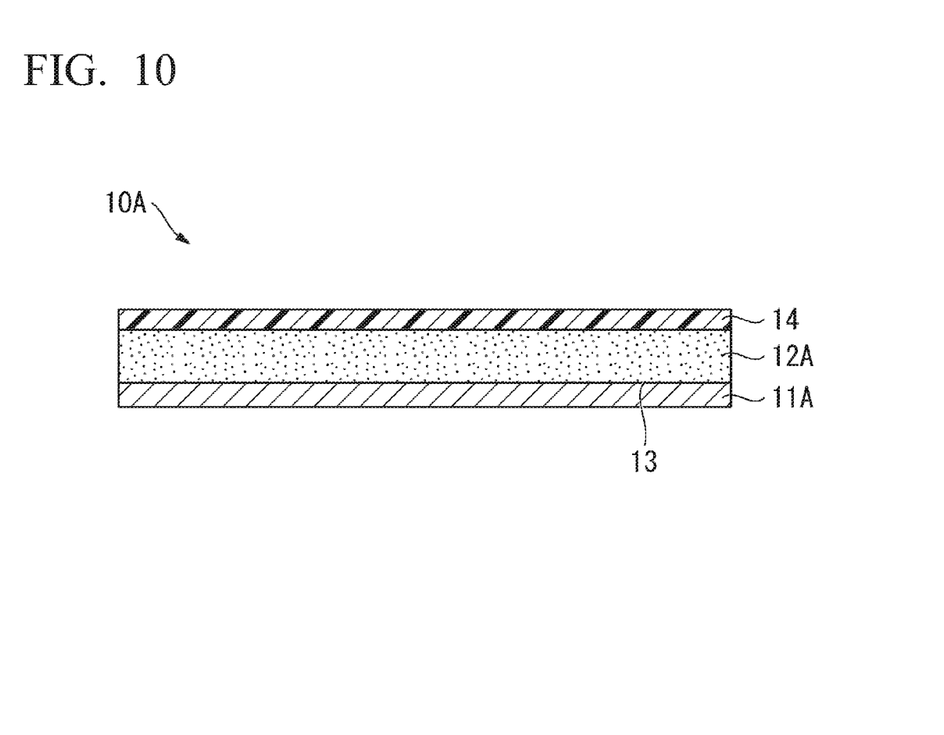
FIG. 10 is a cross-sectional view of an adhesive sheet according to an embodiment.

The adhesive sheet 10A, the film-like substrate can be an aromatic adhesive tape, with shaped tape-like. The tape-like is, for example, having the size in the longitudinal direction with twice or more shapes in comparison with the short direction. In the example shown in FIG. 10, the adhesive sheet 10A has a length twice equal to two or more times its width, wherein the adhesive sheet 10A is an aromatic adhesive tape.

The aromatic adhesive tape can be used for mutual adhesion of other objects. The object for adhesion can be the sheet or the like as mentioned above. When the aromatic adhesive tape is used for adhesive for one another of the sheets, the fragrance is diverged by peeling off the aromatic adhesive tape.

For example, when a packaging sheet is used as the sheet to adhere to one another and packing the other objects in the packaging sheet, it is possible to use aromatic adhesive tape for adhesion between the packaging sheets. In this case, when the aromatic pressure-sensitive adhesive tape is removed from the packaging sheet in order to open the packaging, the fragrance can be diverged. In addition, it is possible to use an aromatic pressure-sensitive adhesive tape to the bonding papers such as, for example, envelopes and message cards, to each other. In this case, when the aromatic adhesive tape for opening the envelopes and message cards is peeled off, the fragrance can be diverged.

When the aromatic adhesive tape is produced, the printing surface 12A is formed on at least one surface of the tape to form an adhesive surface by the aromatic adhesive, and an aromatic adhesive tape is provided. With preparing by above example of the manufacturing method, the aromatic adhesive tape can be formed continuously on a printing surface 12A by printing for large size in the longitudinal direction, and the aromatic adhesive tape is particularly easy to manufacture.

As a further modification of this embodiment, the perfume microcapsule-containing toner of the present embodiment may be soaked into a film substrate by printing, and it may be used as a perfuming agent containing sheet. In the example shown in FIG. 11, aromatic print 10B is the perfuming agent containing sheet includes a impregnated with perfume microcapsules containing toner film base material 11B. A film-like substrate 11B is covered with outer layer 15 which will be described later.

Figure 11:
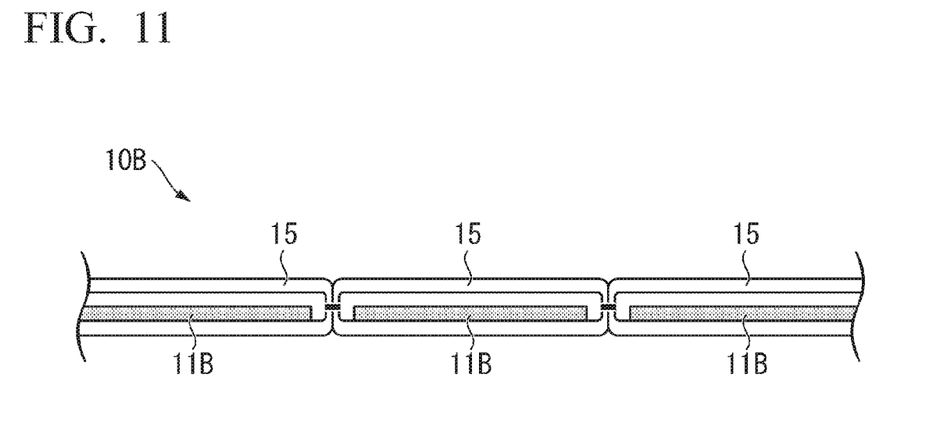
FIG. 11 is a cross-sectional view of an aromatic print according to an embodiment.

In this embodiment, the perfume microcapsule containing toner, containing a solvent with dispersible perfume microcapsules and having tends to soak into a film-like substrate 10B. More specifically, the solvent can be water, an organic solvent, or the like. As the film-like substrate 10B, it is possible to select various sheets. In particular, as the sheet soaked in the solution, cloth, paper or the like may be used. Specifically, non-woven fabric or non-woven paper may be used as the film-like substrate 10B.

The perfuming agent containing may be coated for example the film-like substrate 10B by air tightness of the outer layer 15. By removing the outer layer 15 at the time of use of perfuming agent containing sheet, fragrance is emitted to the outside air from the film-like base material 10B. As the outer layer 15, the one provided with the air tight as appropriate can be used, for example, it is possible to accommodate the perfuming agent containing sheet as, for example, an outer layer 15 adhered to a sheet-like material. As the sheet-like material constituting such an outer layer 15, a single material may be used, and a superimposed multiple materials may also be used. As these materials, a film such as a resin may be used, preferred with difficult to adsorb a perfume component of the perfume microcapsules. For example, it is particularly preferred to using adsorbed resistant materials, and excellent with perfume sealing property, such as polyethylene terephthalate and polyacrylonitrile.

As an example of the method for manufacturing a perfuming agent containing sheet, first, adjusting the perfume microcapsule is containing toner containing the above solvent and the perfume microcapsule. Against the film-like base material 10B, with a non-woven or non-woven paper having a large size, perfume microcapsules containing toner is soaked by printing.

Then, the film-like substrate 10B of the non-woven fabric or non-woven paper was cut to an appropriate size, and covered with an outer layer 15.

When covering the film-form substrate 10B in the outer layer 15, for example, at least one sheet of the outer layer 15 can be applied with an adhesive, the two respective sheet of the outer layer 15 are laminated on both sides of the film-form substrate 10B laminated of the non-woven fabric or the non-woven paper, and it may be used as the laminated outer layer 15. The perfuming agent containing sheet can be easily produced in large quantities due to the example of the manufacturing method above.

EXAMPLES

Hereinafter, the embodiment is further described concretely with reference to examples.

A method of measuring a volume average particle diameter is described.

A volume average particle diameter of each fine particle is calculated as 50% volume average particle diameter. The 50% volume average particle diameter (volume-based median diameter) refers to a particle diameter obtained by accumulating small particle diameters in the volume-based particle diameter distribution to vol. % (similarly, even by accumulating large particle diameters). Following devices are used as volume-based particle diameter distribution measuring devices in accordance with different measured objects.

Toner and toner particle: a "Multisizer 3" manufactured by Coulter, aperture diameter: 100 μm (measured particle diameter range: 2.0~60 μm).

Each fine particle of the perfume microcapsule and the matrix resin (and structural component thereof): a laser diffraction particle size measuring apparatus (manufactured by Shimadzu Corporation "SALD7000"; measured particle diameter range: 0.01~500 μm).

The manufacture of the dispersion liquid of a perfume microcapsule A is described.

Ethylene-maleic anhydride copolymer (product manufactured by Monsanto Chemicals Inc.: EMA-31) is heated and hydrolyzed to obtain 5 mass % of aqueous solution. PH of the aqueous solution is adjusted to 4.5. The aqueous solution 100 g is added with Oily perfume serving as inclusion ("ORANGE-CS OIL IT" manufactured by Ogawa Co., Ltd.) 100 ml as an oil droplet having a particle diameter of 2~3 μm, and emulsified and dispersed with the use of a homogenizer.

The emulsified dispersion liquid is stirred, and meanwhile methylol melamine resin aqueous solution (manufactured by Sumitomo Chemical Co., Ltd. "Sumirez resin 613"; resin concentration: 80 mass %) is added with pure water and added with aqueous solution 50 g of which resin concentration is adjusted to concentration of 17 mass %. The temperature of the system is maintained at 55 degrees centigrade, and the stir is continued for two hours. In this way, a primary coating film of the microcapsule is formed by attaching methylol melamine resin polymerization phase precipitated in the system to the surface of the oil droplet of the oily perfume.

Next, the temperature of the system in which the microcapsule formed by the primary coating film is suspended is cooled to room temperature, and the stir is continued and meanwhile pH of slurry of the microcapsule is decreased to 3.5. Then, the pure water is added in the methylol melamine resin aqueous solution, and then the aqueous solution 80 g whose resin concentration is adjusted to 25 mass % is added in the slurry of the microcapsule, and the temperature of the system rises to a range of 50 degrees centigrade~60 degrees centigrade.

After the rise of the temperature, the stir is continued for an hour, a secondary coating film is formed by attaching high concentration of polymer solution containing needle-like fine pieces of methylol melamine resin precipitated in the system to the surface of the primary coating film of the microcapsule.

The temperature of the system returns to the room temperature and water of 400 g is added. Through the addition of the water, the secondary coating film is hardened completely. In this way, the dispersion liquid of the perfume microcapsule A is obtained. The volume average particle diameter of the perfume microcapsule A is 2 μm.

The manufacture of the matrix resin fine particle (dispersion liquid) is described.

First, a manufacture method (mechanical emulsification method based on mechanical shearing) of dispersion liquid of a matrix resin fine particle R1 is described. A polyester resin (glass transition temperature is 48 degrees centigrade, softening point is 100 degrees centigrade) is used as the binder resin. 99 pts·mass of the polyester resin is added with 1 pts·mass of "TN-105" manufactured by Hodogaya Chemical Co. as a charge control agent and is uniformly mixed by a dry mixer. Then, the polyester resin is melted and kneaded at 80 degrees centigrade by "PCM-45" manufactured by Ikegai Iron Works Ltd. serving as 2 screw kneader. The obtained toner composition is pulverized to 2 mm mesh pass by a pin mill, and the average particle diameter is pulverized to 50 μm by a Bantam mill.

Next, 0.9 pts·mass of sodium dodecylbenzenesulfonate (surfactant) and 0.45 pts·mass of dimethyl amino ethanol (PH adjusting agent) are added in 68.65 pts·mass of ion-exchanged water and mixed. The dispersion liquid is obtained by dispersing 30 pts·mass of pulverized material of the toner composition in the aqueous solution to carry out vacuum degassing.

Then, with the use of high-pressure atomization machine ("NANO3000" manufactured by Bi-tsubu-sha), the dispersion liquid is atomized at 180 degrees centigrade and 150 MPa, and the pressure thereof is decreased while 180 degrees centigrade is maintained. Afterwards, the temperature is cooled to 30 degrees centigrade and the dispersion liquid of the matrix resin fine particle R1 is obtained. The volume average particle diameter of the obtained particle is 0.1 μm.

In a high pressure pulverizer "NANO3000", a high-pressure pipe for heat exchange (heating section) having a 12 m length immersed in an oil bath, a high-pressure pipe (pressurizing section) continuously mounted with nozzles having pore sizes of 0.13 and 0.28 μm, a medium pressure pipe (pressure reducing section) continuously mounted with cells having pore sizes of 0.4, 1.0, 0.75, 1.5 and 1.0 μm and a heat exchange pipe (cooling section) having a 12 m length capable of being cooled by tap-water are arranged.

A manufacture method (mechanical emulsification method based on mechanical shearing) of dispersion liquid of matrix resin fine particle R2 is described. The dispersion liquid of the matrix resin fine particle R2 is manufactured under the same condition as the dispersion liquid of the matrix resin fine particle R1 except that the polyester resin is replaced with the polyester resin (glass transition temperature is 62 degrees centigrade, softening point is 125 degrees centigrade) as the binder resin. The volume average particle diameter of the obtained particle is 0.10 μm.

A manufacture method (mechanical emulsification method based on mechanical shearing) of dispersion liquid of a matrix resin fine particle R3 is described. The dispersion liquid of the matrix resin fine particle R3 is manufactured under the same condition as the dispersion liquid of the matrix resin fine particle R1 except that the polyester resin is replaced with polyester resin (glass transition temperature is 67 degrees centigrade, softening point is 130 degrees centigrade) as the binder resin. The volume average particle diameter of the obtained particle is 0.10 μm.

The manufacture of dispersion liquid of a wax fine particle W is described.

40 pts·mass of ester wax, 4 pts·mass of sodium dodecyl benzene sulfonate (anionic surfactant), 1 pts·mass of triethylamine (amine compound) and 55 pts·mass of ion-exchanged water are mixed in a high-speed shearing stirring pulverizer ("Claire mix" manufactured by M-Tech Co., Ltd.) to prepare mixed liquid. After the mixed liquid in the Claire mix is heated to 80 degrees centigrade, rotational speed of the Claire mix is set to 6000 rpm and the mechanical shearing is carried out within half an hour. After the mechanical shearing is completed, the dispersion liquid of the wax fine particle W is obtained by cooling the mixed liquid to the normal temperature. The volume average particle diameter of the wax fine particle W is 0.6 μm.

The manufacture of the perfume microcapsule-containing toner is described.

First, the manufacture of a toner A is described. 1.5 pts·mass of dispersion liquid of the perfume microcapsule A is stirred by a homogenizer (manufactured by IKA) at a speed of 6500 rpm and meanwhile 2.5 pts·mass of 0.5% polydiallyldimethylammonium ammonium chloride solution is added. Next, after 5 pts·mass of 30% ammonium sulfate solution is added, the mixed liquid is stirred by a 1 L stirred tank arranged with paddle blades at a speed of 800 rpm, and meanwhile the temperature rises to 40 degrees centigrade.

After 40 degrees centigrade is maintained for one hour, solution obtained by mixing and stirring 2.7 pts·mass of the dispersion liquid of the matrix resin fine particle R1, 1.3 pts·mass of the dispersion liquid of the wax particle W and 10 pts·mass of the ion-exchanged water is added. The mixed liquid is stirred by the 1 L stirred tank arranged with paddle blades at 800 rpm, and meanwhile the temperature rises to 40 degrees centigrade.

After 40 degrees centigrade is maintained for one hour, solution mixed with 13.3 pts·mass of the dispersion liquid of the matrix resin fine particle R1 and 73 pts·mass of the ion-exchanged water is added gradually over 10 hours. Then, 10 pts·mass of 10% poly-carboxylic acid sodium salt aqueous solution is added and heated to 68 degrees centigrade, and then cooled after placed for an hour to obtain the toner particle dispersion liquid.

Filtration and cleaning with the ion-exchanged water are repeatedly carried out until conductivity of filtrate to the toner particle dispersion liquid becomes 50 μS/cm. The cleaned toner particle dispersion liquid is dried by a vacuum dryer until moisture content is smaller than 1.0 mass % to obtain dried particle with volume average particle diameter of 8.0 μm.

After the drying processing, 2 pts·mass of hydrophobic silica and 0.5 pts·mass of titanium oxide are added as addition agents in 100 pts·mass of the obtained dried particle, and these addition agents are adhered to the surface of the toner particle to obtain the toner A. The obtained toner A is measured by DSC and Tg is 45 degrees centigrade.

The manufacture of a toner B is described. The toner B is manufacture under the same condition as the toner A except that the matrix resin fine particle R1 is replaced with the matrix resin fine particle R2. The obtained toner B is measured by DSC and Tg is 58 degrees centigrade.

The manufacture of a toner C is described. The toner C is manufacture under the same condition as the toner A except that the matrix resin fine particle R1 is replaced with the matrix resin fine particle R3. The obtained toner C is measured by DSC and Tg is 63 degrees centigrade.

The heating and pressing device is described.

The heating and pressing device 20 shown in FIG. 6 is used as a heating and pressing device A for evaluating heat and pressure.

In the heating and pressing device A, the fixing belt 24 is constituted by nickel electroforming with a thickness of 40 μm, silicone rubber with a thickness of 300 μm coated on the outer peripheral surface thereof and a PFA tube with a thickness of 30 μm for forming a surface layer. The metal roller 21 is constituted by an aluminum core bar with an outer diameter of 38 mm and a thickness of 2 mm and a PFA tube with a thickness of 30 μm coated on the surface thereof. In the fixing roller 22, sponge thickness is 8 mm, diameter is 38 mm, and sponge hardness is 40°.

The press roller 23 is constituted by a metal core bar with an outer diameter of 40 mm and a thickness of 2 mm, a rubber with a thickness of 2 mm coated in the outer peripheral surface thereof and a PFA tube with a thickness of 30 μm for forming a surface layer. The force of the pressure spring of the press roller 23 is 500N.

In the heating and pressing device A with above features, Nip width is 8.0 mm, and the surface pressure is 0.19 N/mm².

A heating and pressing device B serving as another heating and pressing device is used identically to the heating and pressing device A except that the heating and pressing device B is provided with a fixing roller 22 with sponge hardness of 45° as a fixing roller 22. Nip width of the heating and pressing device B is 7.37 mm and surface pressure thereof is 0.21 N/mm².

In examples 1~4 and comparative examples 1~4, an aromatic printed object is manufactured with the use of a manufactured method recorded hereinafter, and a fragrance evaluation is carried out for each of the aromatic printed objects. Types of perfume microcapsule-containing toners, Tgs of perfume microcapsule-containing toners, adhesion amounts of perfume microcapsule-containing toners, types of heating and pressing devices and surface pressures of heating and pressing devices of example 1~4 and comparative examples 1~4 are recorded in table 1.

First, a developing agent is manufactured by mixing each non-coloring aromatic toner and a ferrite carrier coated by the silicone resin to make a toner ratio concentration (concentration of toner to carrier) become 8 mass %. The manufactured developing agent is stored in a developing device of an image forming unit of an electrophotographic MFP ("e-studio 2050c" manufactured by Toshiba Tec Co., Ltd.). The electrophotographic MFP is provided with four kinds of image forming units, a developing agent containing each toner described above is stored in a developing device of one of the image forming units, and colored non-aromatic toners are stored in the developing devices of the rest of the image forming units.

The fixing temperature is set to 135 degrees centigrade, and the toner is printed on a sheet of grammage 90 g. The printing range of non-coloring aromatic toner is the range shown in FIG. 2 and FIG. 3. The laminate body is formed by folding the sheet on which the toner is printed into three folds. The laminate body is heated and pressured by the heating and pressing device A or B that operates at a linear speed of 75 mm/sec, and thus the aromatic printed object is manufactured.

<Fragrance Evaluation>

Each of the manufactured aromatic printed objects is placed for one week under the condition of the temperature of 23 degrees centigrade and humidity of 0% RH. The pressed part of the placed aromatic printed object is peeled off, and evaluation to strength of fragrance is carried out. The evaluation is carried out by averaging determination of 10 judgment members according to the following standards.

A: even if a distance from a nose to the sheet is about 30 cm, the fragrance can be recognized.

B: even if the distance from the nose to the sheet is about 30 cm, the fragrance can be a little recognized, and if the nose approaches the sheet, the fragrance can be recognized better.

C: if the distance from the nose to the sheet is about 30 cm, the fragrance can be very slightly recognized, and if the nose approaches the sheet, the fragrance can be recognized.

D: if the distance from the nose to the sheet is about 30 cm, the fragrance cannot be recognized; however, if the nose approaches the sheet, the fragrance can be recognized.

E: if the nose approaches the sheet, the fragrance can be recognized or cannot be recognized completely.

The evaluation results are recorded in the table 1.

Fragrance evaluation level of the perfume microcapsule-containing toner of the comparative example 3 is D. The toner adhesion amount corresponding to the image part is 1.1 mg/cm$^2$. Thus, the fixing property of fixing the perfume microcapsule-containing toner onto the film-like substrate is low, and when the pressed part of the film-like substrate is peeled off, it is considered that no sufficient shearing force is applied to the perfume microcapsule.

Further, fragrance evaluation level of the perfume microcapsule-containing toner of the comparative example 4 is D. The surface pressure of the heating and pressing device is 0.21 N/mm$^2$. Thus, the perfume microcapsule is destroyed when pressed, and it is considered that the perfume diverges.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An aromatic printed object comprising:
   a film-like substrate and a printing section formed on the film-like substrate using a perfume microcapsule-containing toner; and

TABLE 1

|  | TYPE OF PERFUME MICROCAPSULE-CONTAINING TONERS | Tg OF PERFUME MICROCAPSULE-CONTAINING TONERS | ADHESION AMOUNT OF PERFUME MICROCAPSULE-CONTAINING TONERS | TYPE OF HEATING AND PRESSING DEVICES | SURFACE PRESSURE OF HEATING AND PRESSING DEVICES | FRAGRANCE EVALUATION |
|---|---|---|---|---|---|---|
| EXAMPLE 1 | TONER A | 45° C. | 0.70 mg/cm$^2$ | A | 0.19N/mm$^2$ | A |
| EXAMPLE 2 | TONER B | 58° C. | 0.70 mg/cm$^2$ | A | 0.19N/mm$^2$ | B |
| EXAMPLE 3 | TONER A | 45° C. | 0.45 mg/cm$^2$ | A | 0.19N/mm$^2$ | B |
| EXAMPLE 4 | TONER A | 45° C. | 0.90 mg/cm$^2$ | A | 0.19N/mm$^2$ | A |
| COMPARATIVE EXAMPLE 1 | TONER C | 63° C. | 0.70 mg/cm$^2$ | A | 0.19N/mm$^2$ | C |
| COMPARATIVE EXAMPLE 2 | TONER A | 45° C. | 0.30 mg/cm$^2$ | A | 0.19N/mm$^2$ | D |
| COMPARATIVE EXAMPLE 3 | TONER A | 45° C. | 1.10 mg/cm$^2$ | A | 0.19N/mm$^2$ | D |
| COMPARATIVE EXAMPLE 4 | TONER A | 45° C. | 0.70 mg/cm$^2$ | B | 0.21N/mm$^2$ | D |

As recorded in table 1, fragrance evaluation level of the perfume microcapsule-containing toners of the examples 1~4 is A or B.

On the contrary, fragrance evaluation level of the perfume microcapsule-containing toner of comparative example 1 is C. The glass transition temperature of the perfume microcapsule-containing toner is 63 degrees centigrade. Thus, the fixing property of fixing the perfume microcapsule-containing toner onto the film-like substrate is low, and when the pressed part of the film-like substrate is peeled off, it is considered that no sufficient shearing force is applied to the perfume microcapsule.

Fragrance evaluation level of the perfume microcapsule-containing toner of the comparative example 2 is D. The toner adhesion amount corresponding to the image part is 0.3 mg/cm$^2$. Thus, it is considered that the amount of the perfume microcapsule cannot be ensured sufficiently.

a protective layer adhered to the film-like substrate with the printing section between the film-like substrate and the protective layer; wherein
fragrance diverges from the aromatic printed object by peeling the protective layer off of the film-like substrate.

2. The aromatic printed object according to claim 1, wherein
the perfume microcapsule-containing toner contains an adhesive component.

3. The aromatic printed object according to claim 1, wherein
an adhesion amount of the perfume microcapsule-containing toner on the film-like substrate is within a range of 0.4 to 1.0 mg/cm$^2$.

4. The aromatic printed object according to claim 1, wherein a glass transition temperature of the perfume microcapsule-containing toner is within a range of 40 degrees centigrade to 60 degrees centigrade.

5. The aromatic printed object according to claim 1, wherein
the film-like substrate is a sheet.

6. The aromatic printed object according to claim 1, wherein
the aromatic printed object is an aromatic adhesive tape.

7. A manufacture method of an aromatic printed object, comprising:
forming a printing section using a perfume microcapsule-containing toner containing an adhesive component on a film-like substrate;
forming a film-like substrate laminate body by laminating a film-like substrate and a protective layer across the printing section; and
pressing the film-like substrate and the protective layer across the printing section.

8. The manufacture method of the aromatic printed object according to claim 7, wherein
an adhesion amount of the perfume microcapsule-containing toner on the film-like substrate is within a range of 0.4 to 1.0 mg/cm$^2$.

9. The manufacture method of the aromatic printed object according to claim 7, wherein
a glass transition temperature of the perfume microcapsule-containing toner is within a range of 40 degrees centigrade to 60 degrees centigrade.

10. The manufacture method of the aromatic printed object according to claim 7, wherein
the film-like substrate is a sheet.

11. An aromatic printed object comprising:
a film-like substrate soaked in a perfume microcapsule-containing toner; and
an air tight outer layer coating the film-like substrate, wherein
fragrance diverges from the aromatic printed object by peeling the outer layer off of the film-like substrates.

12. The aromatic printed object according to claim 11, wherein
the air tight outer layer is one selected from the group consisting of non-woven fabric and non-woven paper.

13. The aromatic printed object according to claim 11, wherein
the air tight outer layer is formed with putting the film-like substrate between the sheet materials by sticking.

* * * * *